May 5, 1959 G. W. KING 2,885,471

AUTOMATIC IRIS CONTROL

Filed July 14, 1955

INVENTOR.
GEORGE W. KING

BY

ATTORNEY

United States Patent Office 2,885,471
Patented May 5, 1959

2,885,471

AUTOMATIC IRIS CONTROL

George W. King, Pleasantville, N.Y., assignor to General Precision Laboratory Incorporated, a corporation of New York Application July 14, 1955, Serial No. 521,950

4 Claims. (Cl. 178—7.1)

This invention relates to the automatic control of the iris of a television camera to produce a constant video signal level with varying light intensity.

In the operation of television cameras speed of adjustment is often necessary when moving and changing objects are televised or when several cameras are used in rapid alternation. It is advantageous in such circumstances to employ automatic iris operation, thus eliminating one manual operation and preventing mistakes in iris settings.

The present invention provides this automatic operation. It may be employed with any camera tube which has ample reserve signal output at high light intensities. The usual manually-operated iris which controls the light input to the camera tube is replaced by a motor-operated iris, and a current is derived from the output of the video amplifier which amplifies the camera tube output. The video current thus secured is rectified and amplified, and is then applied to a direct-current balanced electronic stage of amplification operating two plate-circuit relays differentially. The relay circuit employed permits use of non-precision relays having widely separated pick-up and drop-out values of only reasonable constancy. By means of a servo circuit the contacts of these relays are made to operate the iris motor in either direction to open or close the iris until the video output is at a selected level, whereupon both relays are held in the operated condition, stopping the motor.

One purpose of this invention is automatically to control a television camera iris so that the output television signal level is substantially constant.

Another purpose is to provide improved automatic iris control of a television camera by using the camera itself as the light-intensity indicator.

A further understanding of this invention may be secured from the detailed description and the drawings, in which.

Figure 1:
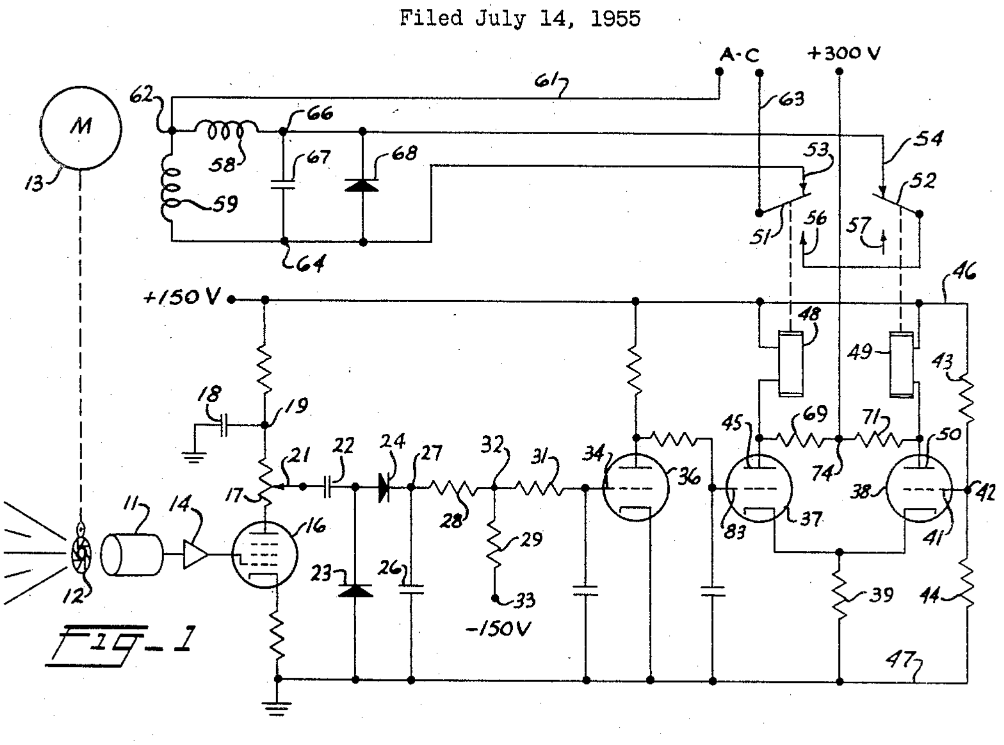
Figure 1 is a schematic diagram of an embodiment of the invention.

Referring now to Fig. 1, a television camera tube 11 is provided with an iris 12 to control the aperture and thus the amount of light reaching the tube. This compensates for variations in light intensity of the scene or object being televised, as is normal and necessary in the design of nearly any camera. The area of the iris opening is increased and decreased by an electric motor 13. The video output of the camera tube 11 is applied to a video amplifier 14 which in usual practice consists of a number of stages having several functions such as amplification, compensation and synchronizing signal insertion. The final stage of this amplifier contains a pentode 16 having a voltage divider 17 in its anode circuit. A by-pass capacitor 18 grounds the junction 19 for video signals, so that the output is zero when slider 21 is at junction 19, and is somewhat over six volts peak-to-peak video signal potential at the other end of the voltage divider when the video signal is at normal level.

The output of slider 21 is coupled through capacitor

22 to a peak-to-peak rectifier comprising diodes 23 and 24, and capacitor 26, the voltage output at junction 27, for a six-volt peak-to-peak input signal, being, at no output load, a direct voltage of plus six volts relative to ground. This direct voltage is applied to a network consisting of resistors 28, 29 and 31, meeting at junction 32. A negative bias of 150 volts is applied from terminal 33 to resistor 29, and resistor 31 is connected to the control grid 34 of a triode 36. These resistors have high enough resistance to impose only a slight load on the rectifier. Resistors 29 and 28 are so proportioned that when slider 21 is set at zero, the voltage at junction 32 resulting from current flow through resistors 29 and 28 and diodes 24 and 23 is about minus five volts. Triode 36 operates with a normal grid bias on the order of −0.1 volt, to attain which, allowing for some loss in the diodes, requires a normal voltage at slider 21 of about plus six volts.

The direct-current triode amplifier 36 is directly connected to a differential balanced direct-coupled amplifier comprising triodes 37 and 38 and having a common cathode resistor 39. The control grid 41 of triode 38 is connected to a junction 42 of resistors 43 and 44 connected between the +150-volt bus 46 and the ground conductor 47. Junction 42 has a potential of about 33 volts. The anodes 45 and 50 of triodes 37 and 38 are connected to the +150-volt bus 46 through windings 48 and 49 of two relays having contact arms 51 and 52 respectively. When the relays 48 and 49 are unoperated their contact arms lie against their back or normally-closed contacts 53 and 54 respectively as depicted in Fig. 1. The front or normally-open contacts are numbered 56 and 57 respectively, the latter being unconnected.

Motor 13 is of the two-phase alternating current reversible type and has operating coils 58 and 59. The common alternating current conductor 61 is connected to the coil junction 62 while the other power conductor 63 is connected to contact arm 51. Contact 53 is connected to motor winding terminal 64 and contact 54 is connected to motor winding terminal 66. A phase splitting capacitor 67 is connected between terminals 64 and 66. Polarities are such that when power is applied to terminal 66 the motor 13 rotates in the direction to open iris 12, and when power is applied to terminal 64 the motor closes the iris. Contact arm 52 is connected to front contact 56. A copper oxide rectifier 68 is connected between terminals 64 and 66 to prevent hunting of the servo system.

With such a circuit when both relays are operated the motor is not operated; when both relays are released, or relay 48 is released and relay 49 is operated, the motor closes the iris; and when relay 49 is released and relay 48 is operated the motor opens the iris.

Resistors 69 and 71 are connected between anodes 45 and 50 of triodes 37 and 38, with the common junction 74 connected to a +300-volt source of direct-current power. This applies current to the relay windings which flows in reverse direction to the flow of anode current, so that the relay operate and release points occur at higher anode currents than they would without this supplementary current source. The purpose of employing this supplementary source is to provide convenient design means for adjusting the relative pick-up and drop-out values of the two relays to provide the desired sensitivity of iris control.

Figure 2:
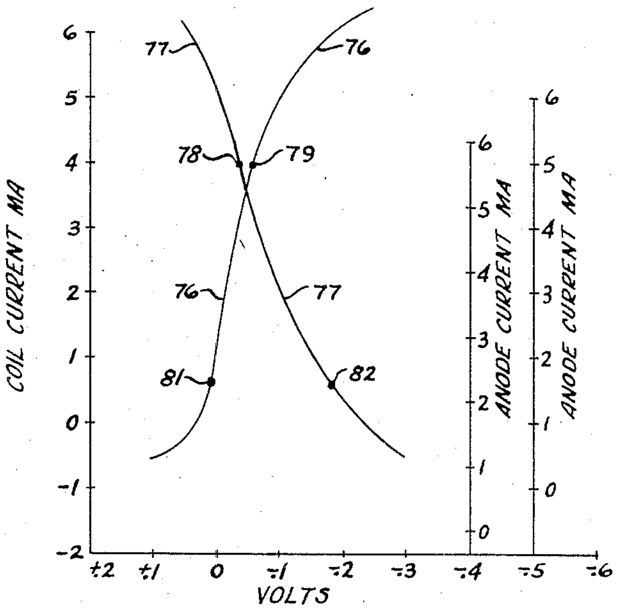
Figure 2 depicts graphs of operating characteristics.

The graphs 76 and 77, Fig. 2, depict the characteristics of relays 48 and 49, respectively, combined with the characteristics of the direct-coupled amplifier comprising triodes 36, 37 and 38. The abscissae represent the difference between the rectified signal in volts impressed on junction 32 and the negative bias existing thereon, this difference being impressed on the control grid 34 of the first amplifier triode 36. The ordinate scale at the left is the measure of the currents through both coils, positive current direction being taken as downward in the coils, and is employed with both of the curves. The ordinate scale at the right having its zero at —.97 milliampere referred to the coil current scale is the scale for measurement of the current flowing through anode 45 of triode 37. This current is greater than the coil 48 current and is drawn partly through coil 48 and partly through resistor 69. The other ordinate scale having its zero at —1.56 milliamperes referred to the coil current scale is the scale for measurement of anode 50 current, this current being greater than coil 49 current because it is drawn partly through resistor 71. One type of relay which may be employed in this invention has a pick-up current of 4 milliamperes and a drop-out or release current of 0.6 milliampere. These points are designated 78, 79, 81 and 82 on the curves referred to the coil current scale.

By way of example specific values of components for the circuit to give the characteristics of graphs 76 and 77 may be: resistor 69, 150 K. ohms; resistor 71, 91 K. ohms; relay coils 48 and 49, 5 K. ohms each. It is apparent in studying the graphs that, with the voltages herein given, changes in these resistance values will shift curves 76 and 77 up or down while not affecting the pick-up or drop-out values. That is, the curves will move relative to the pick-up and drop-out points 78, 79, 81 and 82, and these four points will move horizontally, as the two curves are moved upward or downward. This action thus provides a method for increasing and decreasing the range of operation, for this range in terms of grid volts is the horizontal distance between drop-out points 81 and 82. This distance in the example given is between +0.02 and —0.18 volt, or a range of 0.20 volt at grid 34. It will be noted that in such design the drop-out points 81 and 82 must always embrace the pick-up points 78 and 79, referred to the axis of abscissae.

In the operation of this device, before power is turned on relays 48 and 49 are in their normal positions so that their contact arms 51 and 52 are in contact with their back contacts 53 and 54. When power is turned on it will flow from conductor 63 and through contacts 51/53 to motor terminal 64, so that the motor 13 will rotate in the direction to close the iris. The motor coil 59 is energized directly and coil 58 is energized in quadrature through capacitor 67. Diode 68 prevents resonant quadrature voltage from building up, and also rectifies the alternating voltage applied to it so that direct current flows in coil 58 in addition to alternating current. Both of these actions reduce motor speed very substantially. Motor 13 has a rated speed of 3600 r.p.m. without the rectifier and a speed of about 500 r.p.m. with it, with no tendency to hunt.

When iris 12 has partly closed, assuming camera tube and all other components have attained operating condition, control grid 34, if below normal positive potential (above normal negative potential), causes the current in relay coil 48 to be increased to above its operating point 79. Relay 48 then operates, relay 49 remaining unactuated. This transfers power from motor terminal 64 to terminal 66, reversing motor 13 so that it begins to open the iris. The increasing light reaching camera tube 11 then is translated into an increasing video signal, so that the positive voltage at control grid 34 increases (negative voltage decreases), reducing the potential at the control grid 83 of triode 37. This reduces current in coil 48, and by differential action increases current in coil 49. By reference to Fig. 2, it is found that as the negative abscissa voltage is decreased, at —0.025 volt relay 49 operates at point 78 on graph 77. Both relays being now operated, power is removed from the motor which stops, holding the iris at the aperture size which it has attained. If now the light should increase, the abscissa negative voltage decreases until the drop-out point 81 is reached, when relay 48 releases. This applies current from conductor 63 through contacts 51/53 to motor terminal 64, decreasing the aperture and positive grid potential, so that the negative abscissa voltage increases to point 79 on graph 76, when relay 48 operates, stopping the motor. If on the other hand the light should decrease, decreasing positive grid potential (increasing negative grid potential) is applied to grid 34 and at —.175 grid volts the relay 49 opens at point 82, operating the motor 13 to open the iris, increasing the light, and decreasing negative grid potential as before until relay 49 operates at point 78.

The spread in the position of the quiescent point is the horizontal distance between the graph operating points 78 and 79. If the graphs be moved upward by decreasing the values of resistors 69 and 71, these points 78 and 79 can be made to coincide. This causes the quiescent point to be attained at a single definite light amplitude within the limits of reproducibility of relay pick-up points. The differentials between pick-up and drop-out points have been entirely eliminated so far as any influence on the quiescent range is concerned.

Voltage divider 17 adjusts the relation or scale factor between input light intensity and video signal amplitude. If the relay normal point or range, when both relays are in the operated position, does not correspond to the desired light level, slider 21 is moved upward toward voltage divider terminal 19 to increase the light level at quiescence, and moved oppositely to decrease it.

The video amplifier may contain either electronic tubes or transistors, and the same is true for the direct-coupled amplifiers, transistors being substituted for triodes 36, 37 and 38, or for any of them, with appropriate changes in circuitry as is well understood in the art.

What is claimed is:

1. An automatic iris control for a television camera comprising, a camera tube, an adjustable iris admitting variable light intensities thereto, means for producing a direct current potential whose amplitude is proportional to the light intensity impinging on said camera tube through said iris, a differential amplifier stage including a pair of discharge tubes, means for impressing said direct current potential on said differential amplifier stage, a pair of relays, means comprising a direct current path connecting each of said relays between an anode of a respective one of said discharge tubes and a source of positive potential, resistive means connecting said anodes to a second source of positive potential of higher value than said first mentioned source, a reversible motor connected to drive said iris, and circuit means for operating said motor in one direction or the other depending on which of said relays is operated and for stopping said motor by the simultaneous operation of said relays.

2. An automatic iris control for a television camera comprising, a camera tube means including an adjustable iris for securing a video signal amplitude, means for amplifying said video signal, means rectifying said amplified video signal, a direct-coupled differential amplifying stage including a pair of discharge tubes having differential anode currents, said stage being excited by said rectified signal, a pair of electromagnetic relays each having a single winding having one terminal connected to a respective one of said tube anodes, a first direct-potential positive source, means comprising a direct current path connecting said first direct potential source to the other terminals of said windings, a second direct-potential source of higher positive potential than that of said first source, resistors coupling said second source to said anodes biasing said relay windings by applying currents thereto in the reverse directions to currents therein drawn by said anodes, and servo means for controlling said adjustable iris operated by said pair of relays to maintain constant input light signal intensity and thereby maintaining constant video signal amplitude.

3. An automatic iris control for a television camera comprising, a camera tube, an adjustable iris admitting variable light intensities thereto, means for producing a signal whose amplitude is proportional to the light intensity impinging on said camera tube through said iris, a differential amplifier stage including a pair of discharge tubes, means for impressing said signal on said differential amplifier stage, a pair of relays, means comprising a direct current path connecting each of said relays between an anode of a respective one of said discharge tubes and a source of positive potential, a two phase motor connected to drive said iris, said two phase motor including a pair of field coils connected together with their common junction connected to one terminal of a source of operating potential, each of said relays including a pair of normally engaged fixed contacts each connected to the respective end terminals of said field coils, and one of said relays having a normally disengaged fixed contact connected to the movable contact of the other of said relays.

4. An automatic iris control in accordance with claim 3 in which each of the anodes of said discharge tubes are connected through respective ones of a pair of resistors to a second source of positive potential of higher value than said first mentioned source.

References Cited in the file of this patent

UNITED STATES PATENTS

| | | |
|---|---|---|
| 2,008,511 | McNairy | July 16, 1935 |
| 2,417,506 | Lamb | Mar. 18, 1947 |
| 2,421,476 | Belar | June 3, 1947 |

FOREIGN PATENTS

| | | |
|---|---|---|
| 444,074 | Great Britain | Mar. 12, 1936 |
| 607,315 | Great Britain | Aug. 30, 1948 |